United States Patent
Bazala et al.

(10) Patent No.: US 11,060,488 B2
(45) Date of Patent: Jul. 13, 2021

(54) EXHAUST GAS RECIRCULATION SYSTEM

(71) Applicant: Hanon Systems, Daejeon (KR)

(72) Inventors: Jiri Bazala, Korytná (CZ); Guillaume Hebert, Stare Mesto (CZ); L'uboslav Kollár, Poriadie (SK)

(73) Assignee: Hanon Systems, Daejeon (KR)

( * ) Notice: Subject to any disclaimer, the term of this patent is extended or adjusted under 35 U.S.C. 154(b) by 55 days.

(21) Appl. No.: 16/167,771

(22) Filed: Oct. 23, 2018

(65) Prior Publication Data
US 2019/0120179 A1    Apr. 25, 2019

(30) Foreign Application Priority Data
Oct. 24, 2017   (DE) .......................... 102017218971.1

(51) Int. Cl.
| | | |
|---|---|---|
| *F02M 26/35* | (2016.01) | |
| *F01N 3/02* | (2006.01) | |
| *F02M 26/28* | (2016.01) | |
| *F01N 3/00* | (2006.01) | |
| *F02B 47/02* | (2006.01) | |

(52) U.S. Cl.
CPC ............ *F02M 26/35* (2016.02); *F01N 3/005* (2013.01); *F01N 3/02* (2013.01); *F01N 3/0205* (2013.01); *F02B 47/02* (2013.01); *F02M 26/28* (2016.02); *F01N 2240/02* (2013.01); *F01N 2240/22* (2013.01); *F01N 2570/22* (2013.01)

(58) Field of Classification Search
CPC .......... F02M 26/28; F02M 26/35; F01N 3/00; F01N 3/005; F01N 3/02; F01N 3/0205; F02B 47/02
See application file for complete search history.

(56) References Cited

U.S. PATENT DOCUMENTS

| | | | | |
|---|---|---|---|---|
| 6,301,888 B1* | 10/2001 | Gray, Jr. | ............ | B01D 53/9495 123/568.11 |
| 7,607,301 B2* | 10/2009 | Harada | ............... | F02B 29/0406 123/568.12 |
| 2009/0020263 A1* | 1/2009 | Ohsawa | ................. | F02M 26/28 165/104.11 |
| 2013/0219880 A1* | 8/2013 | Irmler | .................. | F28D 7/0025 60/597 |
| 2015/0275698 A1* | 10/2015 | Kawai | ....................... | F01K 3/10 60/604 |
| 2015/0308318 A1* | 10/2015 | Gibble | .................. | F01K 23/065 60/615 |

(Continued)

FOREIGN PATENT DOCUMENTS

| | | |
|---|---|---|
| DE | 102006040384 A1 | 3/2007 |
| DE | 102012021679 A1 | 5/2014 |

(Continued)

OTHER PUBLICATIONS

Notice of Allowance issued in Corresponding Korean Application No. 10-2018-0125713, dated Apr. 7, 2021 (English Translation provided).

*Primary Examiner* — John Kwon
*Assistant Examiner* — Johnny H Hoang
(74) *Attorney, Agent, or Firm* — Norton Rose Fulbright US LLP; James R. Crawford

(57) ABSTRACT

An exhaust gas recirculation system comprises an exhaust gas cooler (1) downstream of which a condenser (2) is disposed through which flows fresh air (7).

4 Claims, 1 Drawing Sheet

(56) References Cited

U.S. PATENT DOCUMENTS

| | | | |
|---|---|---|---|
| 2016/0115861 A1 | 4/2016 | Ito et al. | |
| 2016/0320139 A1* | 11/2016 | Nakamura | F28D 7/1684 |
| 2017/0138313 A1* | 5/2017 | Fujimoto | F02M 25/0227 |
| 2017/0342949 A1* | 11/2017 | Kikuchi | F02M 35/088 |
| 2018/0094593 A1* | 4/2018 | Leone | F02D 35/027 |
| 2018/0202374 A1* | 7/2018 | Hotta | F02D 37/00 |
| 2019/0136748 A1* | 5/2019 | Anschel | F01N 5/02 |

FOREIGN PATENT DOCUMENTS

| | | |
|---|---|---|
| FR | 2936023 A1 | 3/2010 |
| JP | 2016031042 | 3/1916 |
| JP | H09280118 A | 10/1997 |
| JP | 2008095843 A | 4/2008 |
| JP | 2008280945 A | 11/2008 |
| JP | 2010025034 A | 2/2010 |
| JP | 2012177375 A | 9/2012 |
| JP | 2014185618 A | 10/2014 |
| JP | 2015045261 | 3/2015 |
| KR | 200132957 | 10/1998 |
| KR | 100189681 B1 | 6/1999 |
| KR | 1020140071882 | 6/2014 |

* cited by examiner

EXHAUST GAS RECIRCULATION SYSTEM

This application claims priority from German Patent Application No. 102017218971.1 filed on Oct. 24, 2017, which is hereby incorporated by reference in their entirety.

FIELD OF TECHNOLOGY

The invention relates to an exhaust gas recirculation system.

A special challenge in the field of exhaust gas recirculation consists therein that the recirculated exhaust gas contains water vapor which may condense and damage the engine or surrounding parts such as, for example, the compressor wheel of a turbocharger or the connection rod or the crankshaft. This occurs to an especially high degree in cases in which the engine is cold.

PRIOR ART

US 2016/0115861 A1 discloses an exhaust gas recirculation system comprising an exhaust gas cooler with a condenser through which flows water of the engine cooling system. In the Motortechnische Zeitschrift (MTZ) June 2015, page 22 a device is described that mixes the exhaust gas with fresh air and discharges condensate.

DESCRIPTION OF THE INVENTION

Against this background the invention addresses the problem of providing an exhaust gas recirculation system of simple structure that at least diminishes the problems occurring in connection with condensate.

The problem is resolved through the exhaust gas recirculation system described in Claim 1.

Accordingly, the exhaust gas cooler comprises a downstream condenser through which flows fresh air. By using fresh air, the exhaust gas cooler with the downstream condenser can be structured especially simply. In particular, the exhaust gas is already cooled such that the requirements made of the condenser in view of temperature stability can be comparatively easily satisfied. This applies equally to the throughflow with fresh air. The exhaust gas cooler can especially advantageously form with the condenser a structural unit or at least be attached to it. The condenser can, in particular, be provided in an exhaust gas manifold, which can also be denoted collector, collection tank or head tank. The exhaust gas recirculation system according to the invention can to this extent be implemented thereby that an exhaust gas cooler, which comprises an exhaust gas collector in the same structural unit, is expanded by the feasibility of letting fresh air flow through the exhaust gas collector such that the condenser according to the invention is realized.

Advantageous further developments are described in the dependent claims.

To separate the condensate, the condenser can comprise at least one tube for fresh air to flow through, whose tube axis can extend substantially horizontally such that the condensate collects below and can be discharged from the condenser through an outlet.

In addition, especially good results are anticipated for an implementation in which the tube axis is substantially perpendicular to the direction of flow of the exhaust gas.

For better heat transfer from the exhaust gas, that has to be cooled down further to condensation, to the fresh air tube, it is preferred for the latter to include ribs.

It is further preferred for the condenser to include an outlet leading to a tank. The tank advantageously serves for storing the condensate.

In particular, the tank is preferably connectable to the fresh air side of the engine and/or to an exhaust gas outlet of an internal combustion engine such that, depending on the operating state, there is or are the option or options of recirculating the condensate from the tank under certain operating conditions into the combustion chamber, which increases the efficiency of the engine. Another option is to evaporate the condensate in an operating state, in which, for example, an exhaust gas collector is sufficiently heated, to water vapor and to mix this water vapor into the exhaust gas such that it is discharged from the motor vehicle. In the case in which the condensate is recirculated into the combustion chamber the fuel consumption and the emission are lowered.

Lastly, the condenser is preferably provided in an exhaust gas collector of the exhaust gas cooler such that, while the architectural execution remains compact, the function according to the invention is still attained.

BRIEF DESCRIPTION OF THE DRAWING

In the following an embodiment example of the invention will be explained in greater detail with reference to the Figures. In the drawing depict.

DETAILED DESCRIPTION OF A PREFERRED EMBODIMENT EXAMPLE OF THE INVENTION

Figure 1:
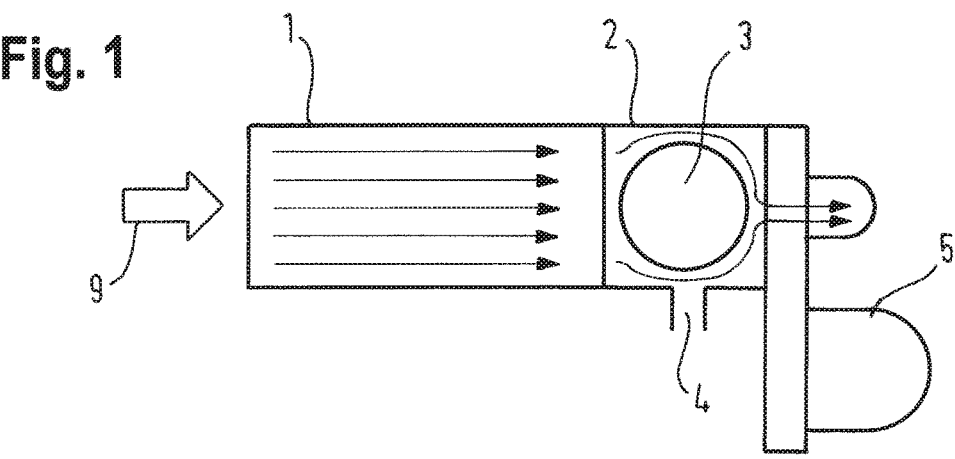
FIG. 1 a schematic side view of the exhaust gas cooler according to the invention.

As can be seen in FIG. 1, the exhaust gas 9 to be recirculated flows first through the exhaust gas cooler 1 and subsequently through the condenser 2. In the depicted case the latter is essentially formed by a volume encompassed by a housing through which extends a fresh air tube 3 whose diameter is only insignificantly less than the dimension of the described condenser housing. At its bottom is located an outlet 4 for the condensate. By 5 is designated an exhaust gas recirculation valve, disposed downstream of condenser 2, that regulates the flow rate of the exhaust gas now freed of the water vapor and consequently dried. Said housing may be the housing of an exhaust gas collector downstream of the exhaust gas cooler 1. The exhaust gas cooler 1 may in particular comprise numerous separate tubes or channels through which the exhaust gas flows, wherein the individual exhaust gas flows are combined in the region of the described exhaust gas collector.

Figure 2:
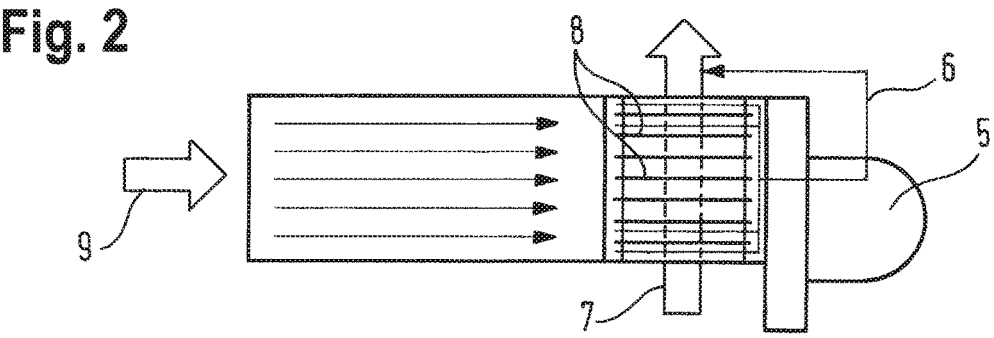
FIG. 2 a schematic bottom view of the exhaust gas cooler according to the invention.

In the bottom view of FIG. 2 ribs 8 are supplementarily indicated which can be developed on the fresh air tube 3 such that they completely encircle it and/or extend parallel to the direction of flow of the exhaust gas. In the bottom view of FIG. 2 can be seen further that the fresh air tube 3 extends fully through the housing of the condenser [2]. The fresh air flow is denoted by 7. It can be seen that a preferred configuration is depicted in which the fresh air flow 7 is substantially perpendicular to the exhaust gas flow.

Figure 3:
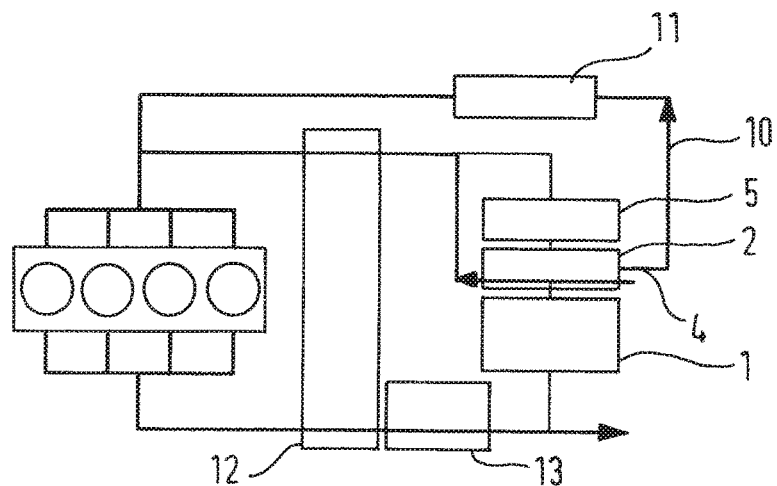
FIG. 3 a schematic diagram in a first operating state.

In FIG. 3 a tank 11 is additionally depicted which is connected to an outlet 4 of the condenser 2 such that across a duct 10 the condensate can be collected in the tank 11. As shown in FIG. 3, the condensate can be recirculated from this tank 11 into the combustion chamber. FIG. 3 further indicates that the engine can comprise an exhaust turbocharger 12 disposed, in the direction of flow, upstream of a catalyst 13.

After the fresh air to be charged, as indicated in FIG. 3, contains recirculated exhaust gas, the condenser [2], disposed according to the invention downstream of the exhaust gas cooler [1], notably deploys its effect since the recirculated exhaust gas has been dried and the water vapor, originally contained therein, cannot do any damage to the compressor wheel of the exhaust gas turbocharger.

Figure 4:
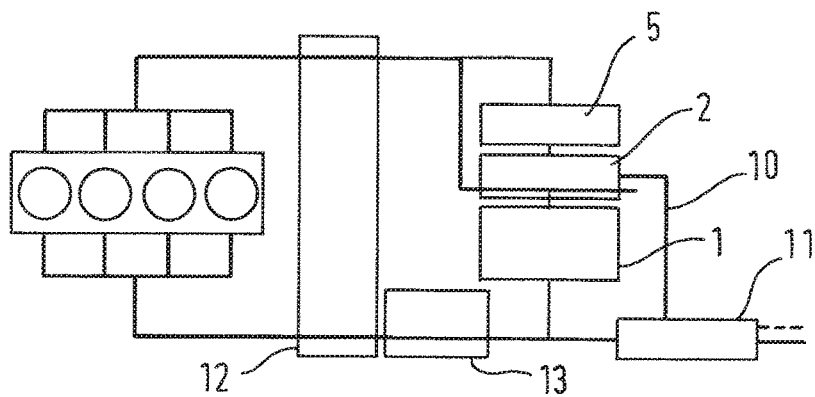
FIG. 4 a schematic diagram in a second operating state.

In FIG. 4 is depicted an alternative diagram in which the condensate is also collected in a tank 11 from which, however, is it evaporated and mixed to the exhaust gas discharged from the motor vehicle. The architectural execution corresponds otherwise to that of FIG. 3.

The invention claimed is:

1. An exhaust gas recirculation system comprising an exhaust gas cooler and a condenser positioned downstream from the exhaust gas cooler,
   wherein the exhaust gas cooler includes a plurality of separated pipes through which exhaust gas passes and an exhaust gas collector for collecting an exhaust gas passing through the plurality of separated pipes, and
   wherein the condenser is formed inside the exhaust gas collector for removing moisture contained in the exhaust gas collector; wherein the condenser is formed as a fresh air tube extending through the exhaust gas collector, and includes an outlet in communication with a tank; and
   wherein the outlet of the condenser is discharging condensed water formed by condensing the moisture contained in the exhaust gas inside the exhaust gas collector to the tank;
   wherein the condenser is formed inside the exhaust gas collector for removing moisture contained in the exhaust gas collector;
   wherein the condenser is formed as a fresh air tube extending through the exhaust gas collector, and includes an outlet in communication with a tank; and
   wherein the outlet of the condenser is discharging condensed water formed by condensing the moisture contained in the exhaust gas inside the exhaust gas collector to the tank.

2. The exhaust gas recirculation system with the exhaust gas cooler according to claim 1, wherein a tube axis of the fresh air tube extends substantially perpendicularly to a direction of flow of the exhaust gas.

3. The exhaust gas recirculation system with the exhaust gas cooler according to claim 1, wherein the fresh air tube comprises ribs.

4. An exhaust gas recirculation system comprising an exhaust gas cooler, and a condenser positioned downstream from the exhaust gas cooler, and an exhaust gas collector for collecting an exhaust gas passing through the exhaust gas cooler;
   wherein the condenser includes an outlet leading to a tank,
   wherein the tank is connected to a combustion chamber and to an exhaust gas outlet of a combustion engine,
   wherein the condensate condensed by the condenser is collected in the tank through the outlet, and the condensate collected in the tank is guided to the combustion chamber, the exhaust gas outlet of the combustion engine, or both the combustion chamber and the exhaust as outlet; and
   wherein the condenser is formed inside the exhaust gas collector for removing moisture contained in the exhaust gas collector;
   wherein the condenser is formed as fresh air tube extending through the exhaust gas collector, and includes an outlet in communication with a tank; and
   wherein the outlet of the condenser is discharging condensed water formed by condensing the moisture contained in the exhaust gas inside the exhaust gas collector the tank.

\* \* \* \* \*